United States Patent
Shemeta

(10) Patent No.: US 9,354,032 B2
(45) Date of Patent: May 31, 2016

(54) ANGULARITY GAGE

(71) Applicant: Paul Joseph Shemeta, Seattle, WA (US)

(72) Inventor: Paul Joseph Shemeta, Seattle, WA (US)

(73) Assignee: West Coast Industries, Inc., Shoreline, WA (US)

( * ) Notice: Subject to any disclaimer, the term of this patent is extended or adjusted under 35 U.S.C. 154(b) by 113 days.

(21) Appl. No.: 14/120,396

(22) Filed: May 16, 2014

(65) Prior Publication Data

US 2014/0360034 A1 Dec. 11, 2014

Related U.S. Application Data

(60) Provisional application No. 61/956,403, filed on Jun. 7, 2013.

(51) Int. Cl.
G01B 5/245 (2006.01)

(52) U.S. Cl.
CPC ...................... G01B 5/245 (2013.01)

(58) Field of Classification Search
CPC ............ G01B 5/245; G01B 3/56; G01B 5/24
USPC ....................... 33/534, 542, 544, 544.1, 544.4
See application file for complete search history.

(56) References Cited

U.S. PATENT DOCUMENTS

| | | | |
|---|---|---|---|
| 2,714,256 A * | 8/1955 | Watson ................. | G01B 5/0023 33/509 |
| 2,912,762 A * | 11/1959 | Semrau ................... | G01B 3/56 33/430 |
| 3,162,953 A | 12/1964 | Porter | |
| 3,254,416 A | 6/1966 | Eisele | |
| 3,570,132 A | 3/1971 | Guzzo | |
| 3,688,412 A | 9/1972 | Keener | |
| 4,200,987 A * | 5/1980 | Schmitt .................... | G01B 3/50 33/501.4 |
| 4,219,936 A | 9/1980 | Bridges | |
| 4,242,801 A * | 1/1981 | Ellison ............... | A63B 37/0002 33/509 |
| 4,266,346 A * | 5/1981 | Olschefski ............. | G01B 7/312 33/542 |
| 4,386,532 A | 6/1983 | Benjamin | |
| 4,455,754 A * | 6/1984 | Benjamin ................ | G01B 7/30 33/505 |
| 4,486,954 A | 12/1984 | Mock | |
| 4,498,241 A * | 2/1985 | Nakaoki ................... | B25H 7/00 33/534 |
| 4,625,427 A * | 12/1986 | Rine ........................ | G01B 5/24 33/509 |
| 4,638,566 A | 1/1987 | Thompson | |
| 4,897,928 A | 2/1990 | Maxville et al. | |
| 5,131,161 A | 7/1992 | Drag | |
| 5,189,808 A * | 3/1993 | Evans ...................... | G01B 7/26 33/542 |
| 5,641,957 A * | 6/1997 | Chae ........................ | G01B 5/24 250/231.14 |
| 7,987,609 B2 * | 8/2011 | Zhang .................... | G01B 5/245 33/533 |

* cited by examiner

*Primary Examiner* — Christopher Fulton
(74) *Attorney, Agent, or Firm* — Mark Zovko

(57) ABSTRACT

A device for measuring the normality of a hole in a work piece, especially in holes used in the building of aircraft. A probe fits within the hole to be measured and is fixed in the hole by contact at the upper end of the hole with a tapered portion of the probe, and at the lower end by a flared portion of the probe. An indicator assembly is connected to the probe by a bracket. The indicator assembly has an arm which contacts the surface of the work piece. The indicator assembly is rotated around the probe during use of the gage, and the arm is vertically displaceable as this rotation occurs. A dial indicator operationally connected to the arm will register any vertical displacement of the arm during its rotation, indicating any deviancy from normality of the measured hole.

7 Claims, 5 Drawing Sheets

ANGULARITY GAGE

CROSS RELATION TO PREVIOUSLY FILED APPLICATIONS

This application claims priority of U.S. Provisional Application 61/956,403 filed Jun. 7, 2013.

BACKGROUND OF THE INVENTION

This disclosure relates in general to a device which can determine if a hole drilled in a work piece is drilled perpendicularly to the work piece surface and, more particularly, to a device for determining the angularity, i.e. the angular displacement or deviation from normality, if any, of the hole. The angularity is measured with respect to the surface where the hole has its entrance opening in the work piece.

It is well known that in certain applications, especially in the aircraft industry, that it is important to determine if a drilled hole which is formed in a work piece is in fact normal to the work piece. In the aircraft industry, it is even more urgent that certain drilled holes are as straight as they are intended to be. For example, if fasteners are installed in holes which significantly deviate from normality in a given structural component of an aircraft, unwanted stress can develop which may result in partial or total failure of the component. In the airplane manufacturing art, countless holes are drilled in the airplane component surfaces which facilitate assembly of the airplane. When you have a nominal sized hole in an airframe, the hole could be a few thousandths of an inch under the nominal size for an interference fit fastener that ideally would never be removed. Alternatively, the hole could be a few thousandths of an inch over the nominal size for a clearance fit fastener that will most likely be removed at some point, such as a bolt holding on a door or piece of electronic equipment. Further adding to the problem of holes deviating from normality, is the fact that different holes will have different tolerances. Rivet holes are loose tolerance since rivets expand to fill the drilled holes. Also, when drilling holes in an airframe, the drilled hole can be made quicker if the hole is slightly tapered. On any given hole, these tolerances can multiply. For example, the drilled hole may be near the low tolerance where the drill exits the material, and near the high tolerance where the drill enters the material. If the fasteners placed into these holes are even slightly misaligned, the structural integrity of the airplane may be compromised. In fact, it is the general practice in the industry to inspect drilled holes to check if they are in fact normal to the work piece. This process of checking if a drilled hole is normal to a work piece is complicated by the fact that the surfaces of an airplane wing or fuselage are, for the most part, curved.

For example, one method, in the prior art, which is cumbersome and complicated, must first determine the hole center line as part of the process of determining hole normality. The center line is determined by using a pin with a diameter as close as possible to the drilled hole, and inserting that pin into the hole. From the previous discussion above, this method becomes problematic. An operator has to carry around a large collection of pins, each with an incrementally different diameter when compared to the last pin, and manually find a pin that "fits" the drilled hole. No pin will properly fit holes as described above which have a low tolerance at one end and a high tolerance at the other end. The pin that "just fits" may fit the bottom portion of the hole, but is free to tip slightly in the hole since it is making contact at only the lower portion of the hole. The cold working process can also inhibit accurate angularity measurement using pins. The cold worked holes when viewed in cross section are not perfectly rectangular due to the cold working process. The top and bottom of the cold worked hole may be slightly dished or bell-shaped at the top and/or bottom of the hole. Thus the pins inserted into the hole to be measured can wobble hampering the measurement process.

SUMMARY OF THE INVENTION

The angularity gage of this disclosure has as its purpose to measure the normality of a hole in a work piece, especially holes used in the building of aircraft. The apparatus has a probe with an external shell. The external shell of the probe is tapered at its upper portion and contacts the inside surface of the hole to be measured at this tapered portion when using the device. The lower portion of the external shell of the probe fits within the hole to be measured and is expandable. A center pin having a flared portion at its end is fitted within the external shell and can be driven forward within the external shell manually by an operator until the flared portion of the external shell contacts the inside surface of the hole at a lower point relative to the contact of the tapered portion of the external shell with the hole. The probe is then fixed within the hole to be measured by this upper and lower contact within the hole to be measured. The contact of the probe with the hole is on an outside diameter around the upper tapered portion of the probe and around an outside diameter of the lower expandable portion of the external shell of the probe. The fixing of the probe within the hole to be measured can occur for a range of hole diameters as the above mentioned upper tapered portion and lower external shell outside diameter contact can accommodate a range of hole diameters or deviances from rectangularity perhaps incurred during the cold working process, countersinking process, or imperfections in the drilling process, such as tapered holes. The probe can vary in size depending on the nominal diameter of the hole to be measured. Typically, the probe used on a particular hole will be sized smaller than the hole and smaller than the low tolerance of the hole. The probe selected for a given sized hole would also be capable of expanding the lower expandable portion of the external shell larger than the nominal hole size and larger than the high tolerance of the drilled hole. The angularity gage presently disclosed can, therefore, be used all with all the reasonably drilled holes in an airframe by changing the probe size. An indicator assembly is connected by a bracket to the probe and the indicator assembly has an arm which starts in contact with the top surface of the work piece. Before operation of the gage, the indicator assembly can be placed on a setting block and the angle of the arm can be set to a predetermined desired angle from the horizontal. The indicator assembly can then be adjusted to insure the arm is in contact with the top surface of the work piece prior to use of the angularity gage. Preferably, to provide coarse adjustment of the arm before it makes its orbit around the hole to be measured, an indicator slide connected to the indicator assembly is also operationally connected to a rack and pinion assembly. The rack and pinion assembly has a pinion gear engaged with a gear rack. The purpose of the rack and pinion assembly is to compensate for the limited vertical range of travel of the arm during the actual operation of the angularity gage. It provides the dial indicator with a zero reading at the start of the operation over a range of probe depth in the hole to be measured. The rack and pinion assembly can be manually controlled by use of an arm adjustment knob to allow the operator to start the arm of the indicator assembly on the top surface of the work piece once the probe is fixed within the hole. The arm is vertically displaceable as it is rotated around the outside of the hole to be measured. An indicator dial is operationally connected to the arm and registers any changes in vertical displacement of the arm, indicating deviancy from normality as the tracking device is rotated around the hole to be measured. The operator can determine from the reading on the dial whether the measured hole fits within the accepted tolerances and is, in fact, normal. The probe is disposed within a cavity in a gage bracket. The indicator assembly including the dial indicator is connected to the probe part of the angularity gage through this gage bracket.

DESCRIPTION OF THE PREFERRED EMBODIMENT

Figure 1:
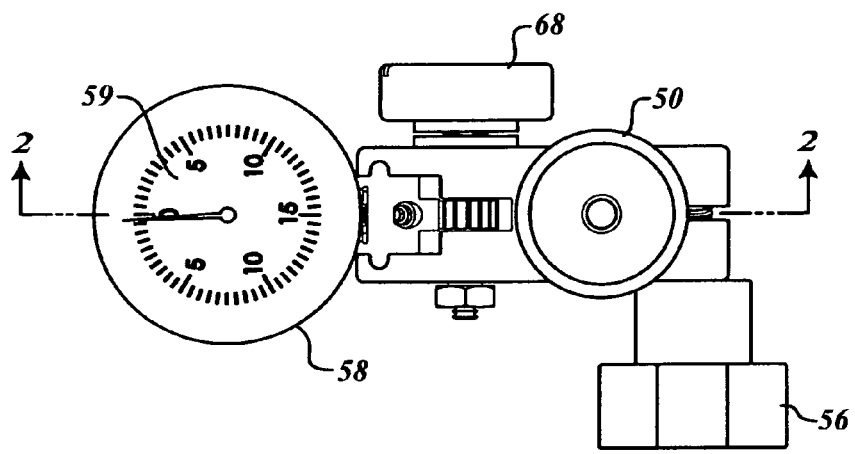
FIG. 1 is a top view of the apparatus of the disclosure
Figure 2:
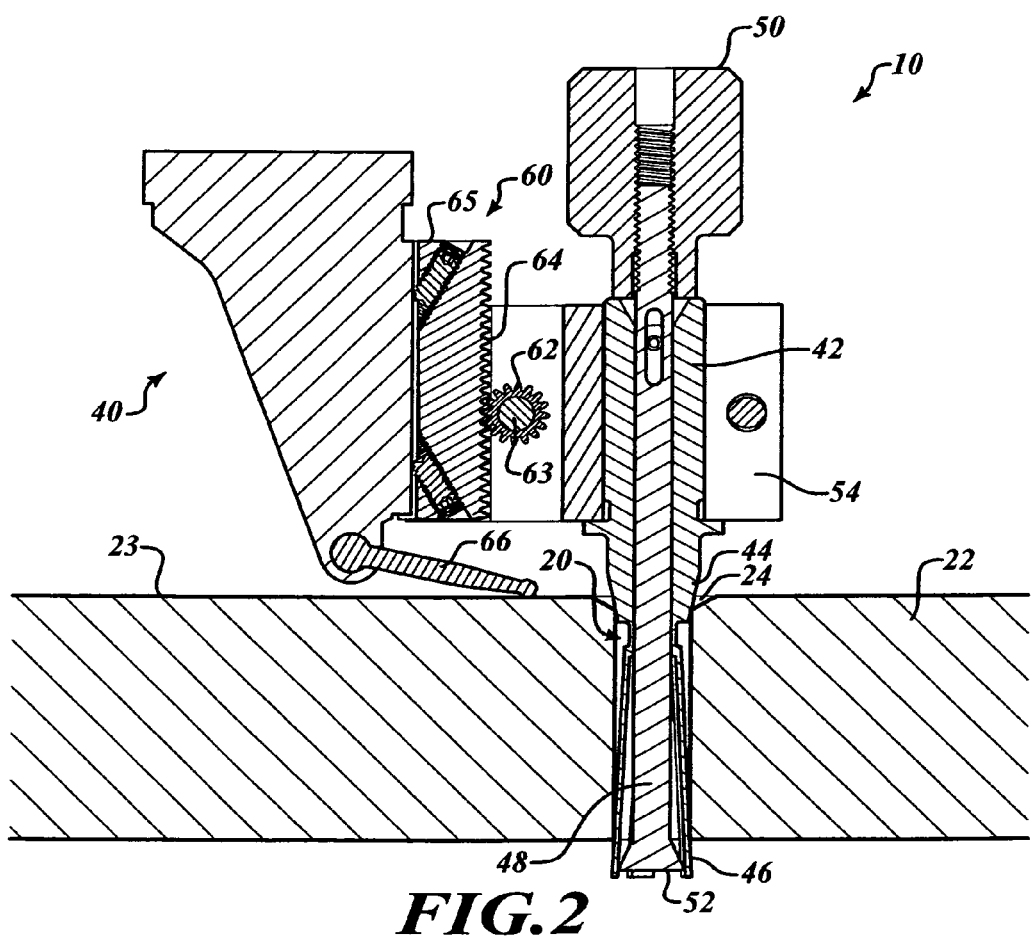
FIG. 2 is a cross sectional elevation view of the apparatus of the disclosure through line A-A of FIG. 1
Figure 3:
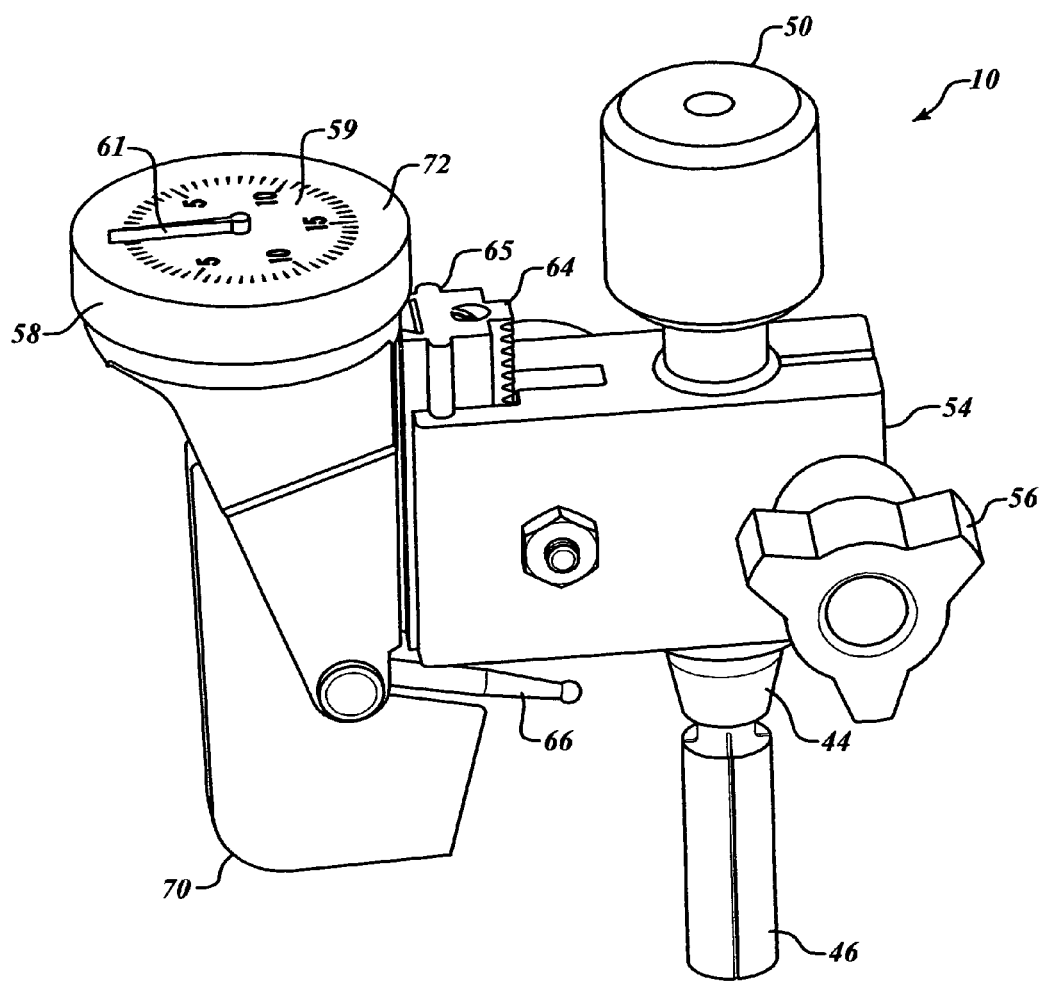
FIG. 3 is a pictorial view of the disclosed angularity gage
Figure 4:
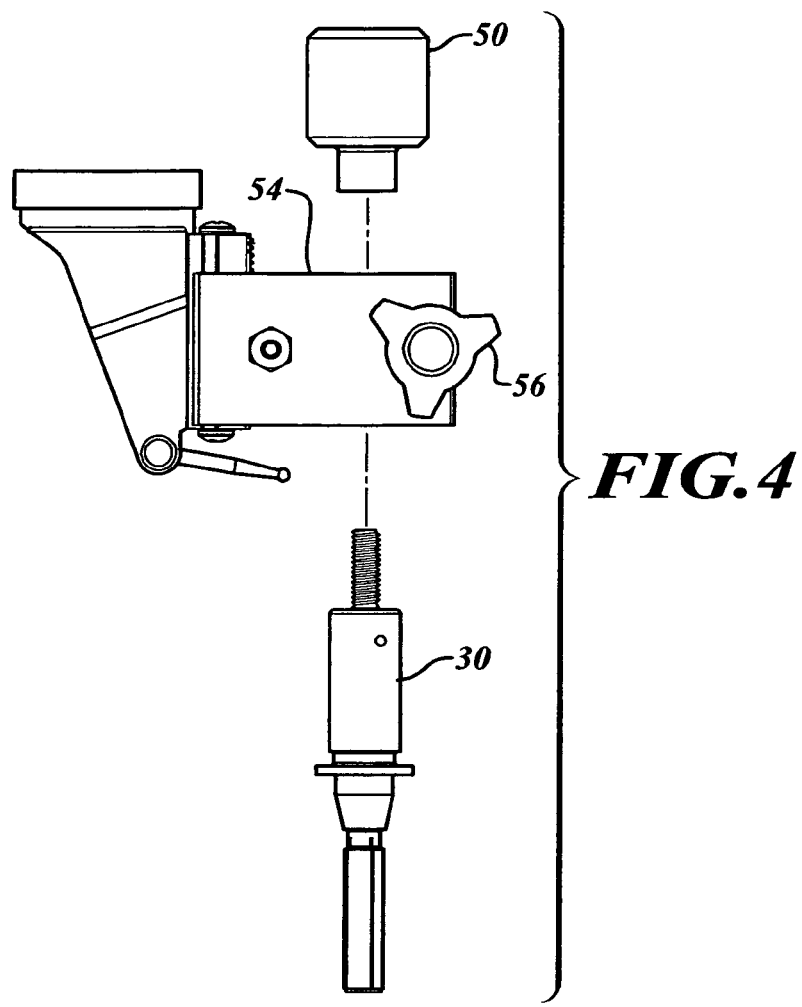
FIG. 4 is an elevation exploded view of the angularity gage of the disclosure prior to use on a hole.

Referring to the Figures (especially FIGS. 1-3), the angularity gage, generally designated as 10, is shown which is used to determine whether a straight walled hole 20 in a work piece 22 having a top surface 23 is in fact normal to the work piece 22. The hole 20 has a cold worked or countersunk portion 24 which has "dished" the top of the hole 20. The angularity gage 10 has two essential parts, a probe part, which is generally designated as 30 and an indicator assembly generally designated as 40. The probe 30 has an external shell 42 having an upper tapered portion 44 and a lower expandable portion 46. A center pin 48 fits through the external shell 42 and is threaded to a center pin adjusting knob 50. The center pin 48 has a flared portion 52 which contacts the internal surface of the lower expandable portion 46. The external shell 42 fits within a gage bracket 54, and probe lock knob 56 is threaded into gage bracket 54. Probe lock knob 56 can be tightened to retain the probe portion 30 in gage bracket 54 or loosened to permit replacement of probe portion 30 with a different diameter probe portion, thus accommodating a range of hole sizes with the same general apparatus. The gage bracket 54 connects the indicator assembly 40 of the angularity gage 10 to the probe portion 30. The indicator assembly 40 of the angularity gage 10 has a dial indicator 58 with a dial face 59 having a needle 61 to indicate deviancy (if any) from normality of the hole 20 as angularity is measured. The dial indicator 58 also has a bezel 72 which can rotate without moving needle 61. The dial indicator 58 is connected to a gear rack and pinion assembly, generally designated as 60 which includes pinion gear 62 fitted on gear shaft 63 operationally connected to a gear rack 64. The gear rack is integral to indicator slide 65 which in turn is connected to the indicator assembly 40. The indicator assembly 40 has an indicator arm 66 which is in contact with the top surface 23 of the work piece 22 during use of the angularity gage 10. An arm adjustment knob 68 is connected to the gear shaft 63 and allows an operator to move indicator slide 65 vertically to adjust the indicator arm 66 vertically and thereby contact the top surface 23 of the work piece 22 before checking of the hole 20 for normality begins. As the knob 68 is turned, the gear shaft 63 rotates the pinion gear 62 which moves the gear rack 64 and indicator slide 65 vertically. Consequently, the indicator arm 66 moves either up or down relative to the top surface 23 of the work piece 22 allowing a coarse adjustment of the arm 66. This adjustment is needed as the probe portion 30, depending on the specific hole, can be varied in its vertical alignment. Also provided is a setting block 70. The indicator assembly 40 is placed on setting block 70 prior to using the angularity gage. The indicator arm 66 can be aligned at a desired angle using the setting block 70 as the indicator arm 66 is frictionally held to the indicator assembly 40, and can be set to the angle that an operator chooses. It has been found that setting the indicator arm 66 to an angle of 15 degrees from the horizontal provides the most accurate readings, as the dial indicator 58 will read accurately only when indicator arm 66 is close to the body of the indicator assembly 40.

Figure 5:
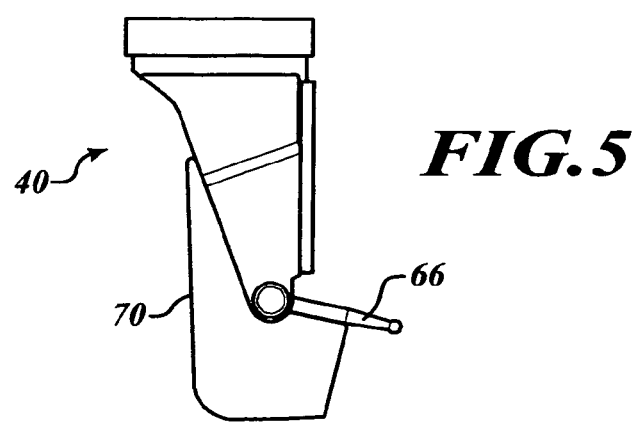
FIG. 5 is an elevation view of the indicator assembly of the angularity gage showing a setting block for adjusting the angle of the indicator arm.
Figure 6:
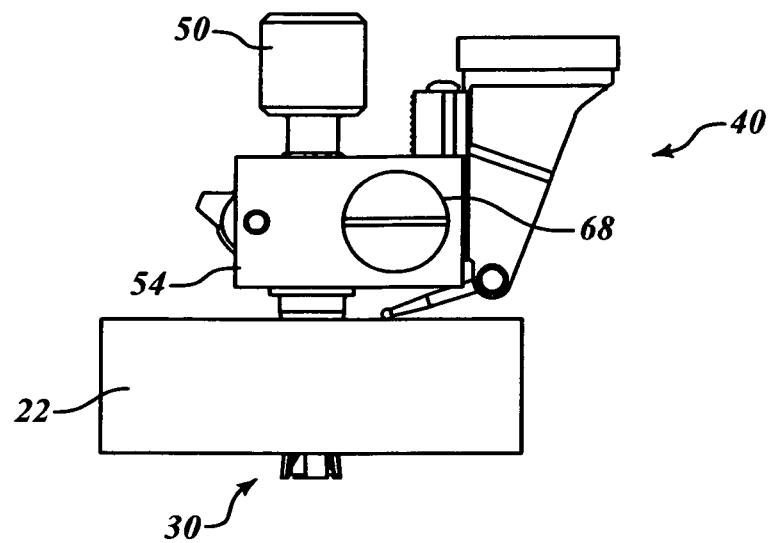
FIG. 6 is an elevation view of the indicator assembly of the angularity gage after the probe is inserted into the hole to be measured.
Figure 7:
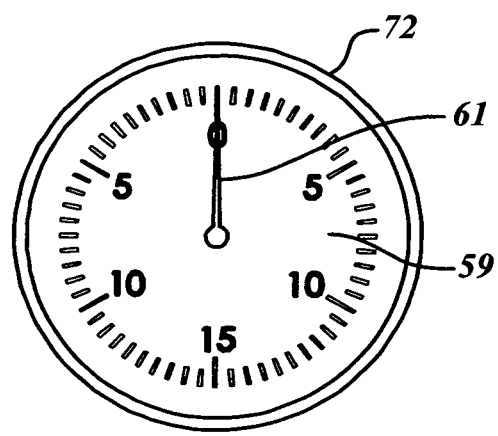
FIG. 7 is top view of the dial indicator of the angularity gage with the dial needle at a zero reading.
Figure 8:
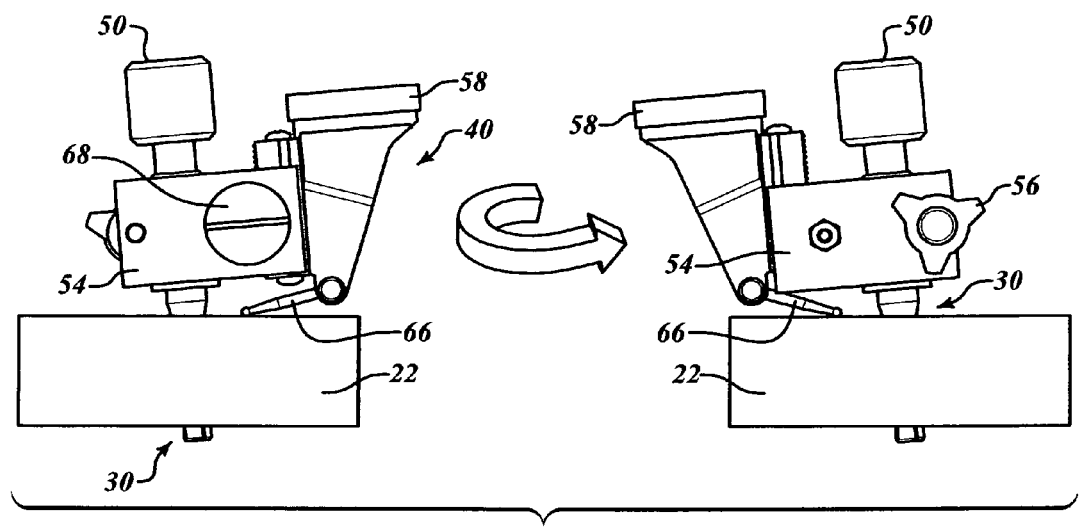
FIG. 8 is an elevation view of the angularity gage showing it rotating around the hole in the work piece.
Figure 8A:
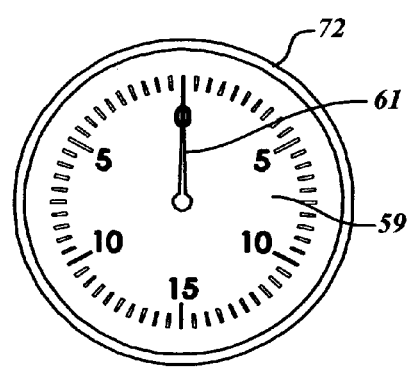
FIG. 8A shows the dial face of the dial indicator prior to rotation of the angularity gage around the hole to be measured.
Figure 8B:
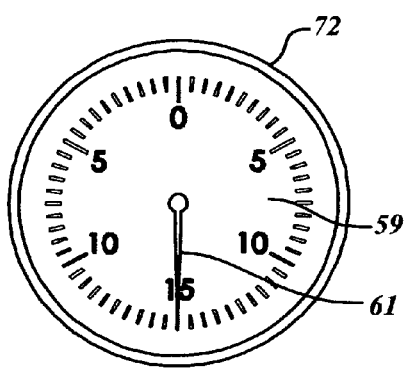
FIG. 8B shows the dial face of the dial indicator after 180 degrees rotation of the angularity gage around the hole to be measured.

The operation of the angularity gage 10 herein disclosed can be described with reference to the Figures and especially FIGS. 2 and 4 through 8B. Initially, a properly sized probe 30 is selected for the hole to be tested. As mentioned previously, the probe 30 selected for the particular hole will be sized slightly smaller than the hole and smaller than the low tolerance of the hole. The probe 30 selected for a nominal sized hole would also be able to expand the lower expandable portion 46 of external shell 42 to a diameter larger than the nominal hole size including the drilled hole's tolerance. The center pin adjusting knob 50 is first removed from the angularity gage 10 and the probe lock knob 56 is loosened to expand the gage bracket 54, allowing insertion of the probe 30 into the gage bracket 54 (see FIG. 4). After the probe 30 is fit into the gage bracket 54, the probe lock knob 56 is tightened to secure the probe 30 within the gage bracket 54, preventing slippage of the probe 30 relative to the gage bracket 54 during the actual measurement process. At this point, the indicator arm 66 of indicator assembly 40 is placed on setting block 70, so that indicator arm 66 is held at a desired angle to the horizontal as best shown in FIG. 5. The dial indicator 58 used has been found to give the most accurate reading when the indicator arm 66 is at an angle of 15 degrees from the horizontal when the indicator assembly 40 is substantially vertical. Use of setting block 70, allows the angularity gage 10 to produce a specific reading which correlates to an angle measurement showing deviancy from normality. The reading from the drilled hole can be compared to a predetermined allowable deviancy to ascertain if the drilled hole passes or fails this normality test. After setting the angle of indicator arm 66 at the appropriate angle from horizontal using setting block 70, the probe 30 of the angularity gage 10, is inserted into drilled hole 20 to be measured until the outside circumference of upper tapered portion 44 of the external shell 42 contacts the upper inner surface of the hole 20 as shown in best in FIG. 2. The outside circumference of the upper tapered portion 44 will contact the inside circumference of the hole to be measured in an annular ring around the upper tapered portion 44. The taper of the upper tapered portion 44 of the external shell 42 allows the device to be used with a range of hole tolerances as the external shell 42 will be inserted into hole 20 until the upper tapered portion 44 of the external shell 42 contacts the inner surface of the hole to be measured. The center pin adjusting knob 50 is then turned, driving the center pin 48 through the external shell 42 toward the top of hole 20 until the flared portion 52 of center pin 48 forces outside circumference of lower expandable portion 46 to expand outwardly to contact at an annular ring around the lower expandable portion 46, the inner surface of the hole 20 at its bottom. At this point, the probe portion 30 of the angularity gage 10 is fixed within the hole 20 due to contact with the internal surface of hole 20 at a top outside circumference and a bottom outside circumference. The device is anchored at an upper end of the hole 20 through the upper tapered portion 44 of the external shell 42 contacting the inner surface of the hole 20, and at the lower end of the hole by the center pin 48 with its flared portion 52 driving the lower expandable portion 46 of external shell 42 to contact with the inner surface of the hole 20 to be measured as shown best in FIG. 2. At this point, arm adjustment knob 68 can be adjusted to allow contact of arm 66 with the top surface 23 of the work piece 22. The indicator assembly 40, connected to the bracket 54, which is in turn connected to the probe 30 of the angularity gage 10 is then rotated 360 degrees around the hole 20 as best shown in FIG. 8. As the indicator assembly 40 is rotated, any vertical variation of the arm 66 will be transmitted to the dial indicator 58 and register by movement of needle 61 on the dial face 59. A perfect hole would keep the needle 61 of the dial face 59 at a zero reading throughout the entire rotation around the hole. Any vertical change that the indicator arm 66 experiences in its orbit around the hole 20 will cause needle 61 on the dial face 59 of dial indicator 58 to move. In practice the operator will find the highest reading on the dial indicator 58 after one rotation. Adjusting a bezel 72 on the dial indicator 58 will allow the needle 61 to be set to zero at this reading as the bezel 72 can rotate dial face 59 of dial indicator 58 without moving the needle 61. The angularity gage 10 is then again rotated 360 degrees around the hole, and the highest reading on the dial face 59 is noted. The hole will either pass or fail the normality test depending on the accepted predetermined tolerance when correlated to the reading of needle 61 on the dial face 59.

This invention may be embodied in other forms without departing from the spirit or essential characteristics thereof. The present embodiments are, therefore, to be considered in all respects as illustrative and not restrictive, the scope of the invention being indicated by the appended claims rather than the foregoing description, and all change which comes within the meaning and range of equivalency of claims is intended to be embraced therein.

What is claimed is:

1. Apparatus for measuring the angularity of a hole having an upper end, a lower end, and an inner surface within a work piece having a top surface comprising: a probe having an external shell with an upper and lower portion for inserting into a hole to be measured, the upper portion of the external shell of said probe having a tapered portion which contacts said inner surface of the hole at said upper end of the hole to be measured at an annular ring around said tapered portion of said probe, the lower portion of the external shell fitting within the hole to be measured; a center pin fitted within said external shell of said probe, said center pin when driven forward forcing said lower portion of said external shell of said probe to expand thereby contacting said inner surface of the hole at an annular ring around the lower portion of said external shell of said probe at said lower end of the hole, thereby fixing said probe within the hole to be measured; an indicator assembly connected to said probe, said indicator assembly having an arm in contact with the top surface of the work piece, said arm vertically displaceable as it is rotated around the outside of the hole to be measured; and an indicator dial operationally connected to said arm of said indicator assembly whereby said indicator dial displays any deviation in vertical displacement of said arm as said arm is rotated around the top surface of the work piece containing the hole to be measured, thereby indicating the normality of the hole.

2. The apparatus of claim 1 which includes a rack and pinion assembly operationally connected to said arm which adjusts the movement of said arm vertically.

3. The apparatus of claim 2 wherein said rack and pinion assembly can be manually controlled so as to start said arm on the top surface of the work piece once said probe is fixed in the hole to be measured.

4. The apparatus of claim 3 which includes an indicator slide connected to said indicator assembly which responds to vertical adjustment of said rack and pinion assembly, thereby moving said arm vertically.

5. The apparatus of claim 1 wherein said center pin has a lower flared portion which contacts and expands said lower portion of said external shell as said center pin is driven forward through said external shell.

6. The apparatus of claim 1 which includes a gage bracket having a internal cavity which receives said probe, and connects to said indicator assembly.

7. The apparatus of claim 1 which includes a setting block wherein the indicator assembly is placed on the setting block prior to operation of the angularity gage and the arm of said indicator assembly is set at a predetermined angle to the horizontal.

* * * * *